United States Patent [19]

Slavik

[11] Patent Number: 4,739,658

[45] Date of Patent: Apr. 26, 1988

[54] LEVEL SENSING SYSTEM

[75] Inventor: William H. Slavik, Palos Hills, Ill.

[73] Assignee: Nuvatec, Inc., Downers Grove, Ill.

[21] Appl. No.: 847,165

[22] Filed: Apr. 2, 1986

[51] Int. Cl.$^4$ .................. G01F 23/24; G01N 27/46
[52] U.S. Cl. ................................ 73/313; 307/308;
                                            324/426; 340/636
[58] Field of Search ............ 73/313, 290 R; 324/433,
                                            324/426; 340/636

[56] References Cited

U.S. PATENT DOCUMENTS

| | | | |
|---|---|---|---|
| 3,552,209 | 1/1971 | Johnston | 73/304 R |
| 3,992,662 | 11/1976 | Koepnick et al. | 324/433 X |
| 4,020,414 | 4/1977 | Paredes | 324/433 |
| 4,038,634 | 7/1977 | Caliri | 340/52 X |
| 4,140,996 | 2/1979 | Leitch et al. | 340/521 |
| 4,203,325 | 5/1980 | Cowles et al. | 73/304 R |
| 4,254,375 | 3/1981 | Matsuoka | 324/140 R X |
| 4,348,666 | 9/1982 | Ogita | 340/753 |
| 4,396,889 | 8/1983 | Aria | 324/433 |
| 4,424,491 | 1/1984 | Bobbett et al. | 324/433 |
| 4,461,175 | 7/1984 | Baumgart et al. | 324/96 X |
| 4,470,296 | 9/1984 | Kobayashi et al. | 73/313 X |

Primary Examiner—Daniel M. Yasich

Attorney, Agent, or Firm—Willian Brinks Olds Hofer Gilson & Lione Ltd.

[57] ABSTRACT

A monitoring unit for remotely monitoring liquid levels in a container includes a common probe, a reference probe, and four sensing probes, each mounted to the container in electrical contact with liquid within the container. A liquid level sensing unit measures resistance between the common probe and the reference probe and uses the measured resistance as a threshold to determine which of the sensing probes is in contact with liquid in the container. In this way, the sensing unit is made substantially independent of the resistivity of the liquid in the container. The sensing unit is connected to an evaluating unit by a single conductor, and the sensing unit draws a variable amount of current through the conductor in accordance with the number of sensing probes in contact with liquid in the container. The conductor thus supplies power to the sensing unit and also transmits information from the sensing unit to the evaluating unit. The evaluating unit includes a current-to-voltage converter which generates voltage proportional to the current drawn by the sensing unit. A display circuit displays an indication of the resulting voltage.

15 Claims, 2 Drawing Sheets

LEVEL SENSING SYSTEM

BACKGROUND OF THE INVENTION

The present invention relates to sensing systems which remotely indicate a sensed parameter, and in particular to such systems used to sense the level of liquid in a container.

In the past, the level of a liquid in a holding tank in recreational vehicles has been measured and monitored by various means. One particularly popular approach has been to install electrically conductive probes through the side walls of the container at appropriate heights, and to measure the electrical conductivity of the probes with respect to a common probe in order to determine which of the probes is below the liquid level in the container. Typically, five probes have been used per container, a common probe and a sensing probe for the $\frac{1}{4}$, $\frac{1}{2}$, $\frac{3}{4}$, and Full levels. In the past, conductors from each of these probes have been routed to a monitor panel mounted in a convenient location inside the recreational vehicle. Typical wire length for each of these five conductors is often in the neighborhood of 25 feet.

Liquid level monitoring systems of the type described above have a number of significant drawbacks. First, the conductivity of liquids typically held in recreational vehicles (such as waste, sewage, and fresh water, for example) varies widely, by more than ten to one. This variation in liquid conductivity makes it difficult to select a single value of conductivity which can be used to distinguish clearly between a sensing probe above the liquid level and a sensing probe below the liquid level. Furthermore, when liquids are splashed against the side walls of the container, false or misleading indications can result. For example, the full indicator may be illuminated while the $\frac{3}{4}$ full indicator is not.

A second important drawback is that the system described above requires a relatively large number of conductors to connect the probes to the electronics of the mounting panel. In the past, five separate wires have been used, which require a considerable amount of labor to interconnect and which bring with them potential for error, potential for failure, and difficulty in routing and concealing the wires. In addition, the use of five separate wires increases the cost of the system.

SUMMARY OF THE INVENTION

The present invention is directed to an improved sensing system which to a great extent overcomes the problems of the prior art described above.

According to a first feature of this invention, a liquid level sensing system for sensing the level of a liquid in a container is provided which comprises a set of level sensing probes, a common probe, and a reference probe, each positioned at a respective level in electrical contact with a respective interior portion of the container. Means are provided for providing a reference signal indicative of electrical resistance between the common probe and the reference probe through the liquid, and means are provided for providing a set of sensing signals, each indicative of electrical resistance between the common probe and a respective one of the level sensing probes through the liquid. The reference signal is compared with the sensing signals and at least one output signal is provided in response to the comparison, indicative of the number of sensing signals which deviate from the reference signal by more than a selected amount.

In the preferred embodiment described below, the reference probe is used to measure the nominal resistance of the liquid in the container. The reference probe is used as one of the arms of a set of bridge circuits, and each of the level sensing probes is used as the other arm in a respective one of the bridge circuits. A plurality of voltage comparators are used to check each of the bridges for balance, and in this way to determine the presence or absence of liquid at the respective level sensing probes.

According to a second feature of this invention, a sensing system is provided which comprises an evaluating unit and a sensing unit. A conductor interconnects the evaluating and sensing units, and means are provided in the evaluating unit for supplying current to the conductor. The sensing unit includes sensing means for providing a sensor signal indicative of a sensed parameter, which sensor signal has at least three states. Means are provided in the sensing unit for modifying current through the conductor such that the magnitude of current is indicative of the state of the sensor signal, and means are included in the evaluating unit for determining the magnitude of the current in the conductor in order to ascertain the state of the sensor signal. Preferably, the sensor means itself is powered by current from the conductor, such that only a single conductor is required both to transmit information from the sensing unit to the evaluating unit and to power the sensing unit.

This second feature of the invention can be used to monitor and display various parameters. For example, a recreational vehicle typically includes monitoring systems for monitoring the level of LP gas and for monitoring battery condition. In each case, a suitable sensing circuit can be provided which converts the sensed parameter into current levels in a manner analogous to that described below. Furthermore, the sensing system of this invention can be used with a variety of liquid level sensors. For example, a sensing system which measures pressure to determine water column height and then encodes the measured pressure as a current can be substituted for the probe system described below.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
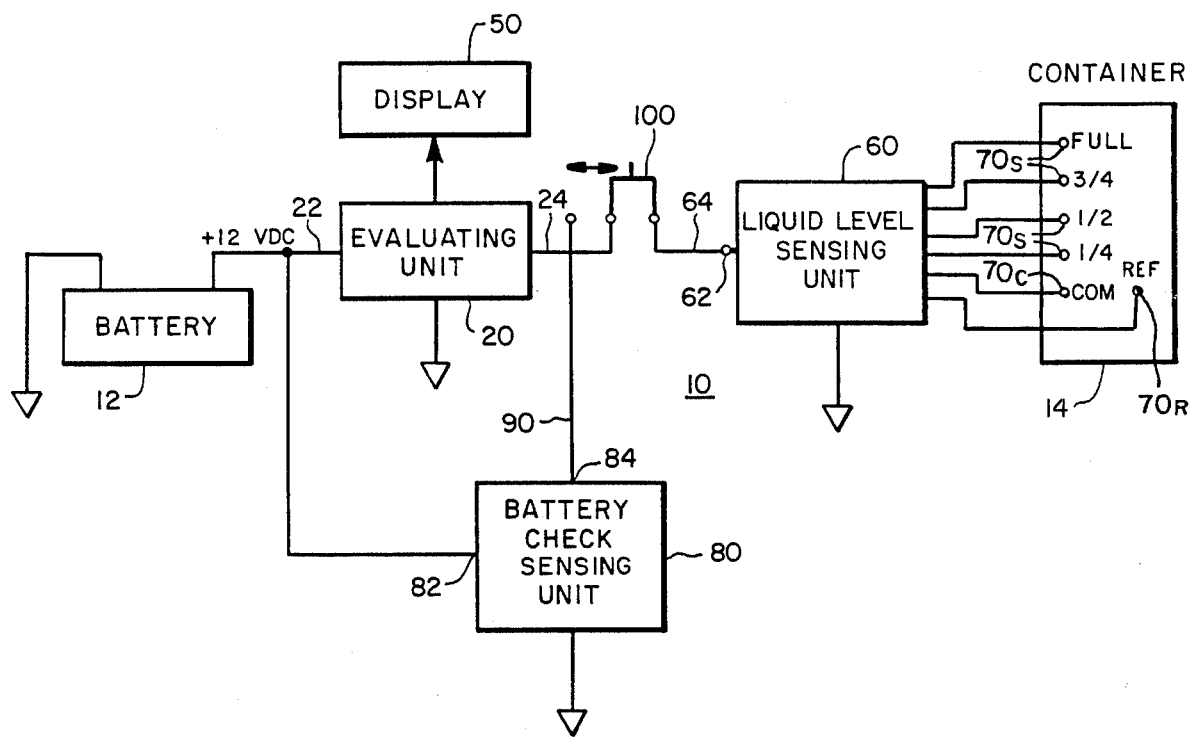
FIG. 1 is a schematic view of a monitoring system which incorporates a presently preferred embodiment of this invention.

Turning now to the drawings, FIG. 1 shows a block diagram of a monitoring system 10 which incorporates a presently preferred embodiment of this invention. This monitoring system 10 is adapted for use in a vehicle such as a recreational vehicle, for example, which includes a battery 12 and at least one container 14 which contains a liquid, the level of which is to be sensed.

The monitoring system 10 includes an evaluating unit 20 which can be connected either to a liquid level sensing unit 60 or to a battery check sensing unit 80 by means of a switch 100. The evaluating unit 20 controls a display 50 to indicate the sensed parameter.

Figure 3:
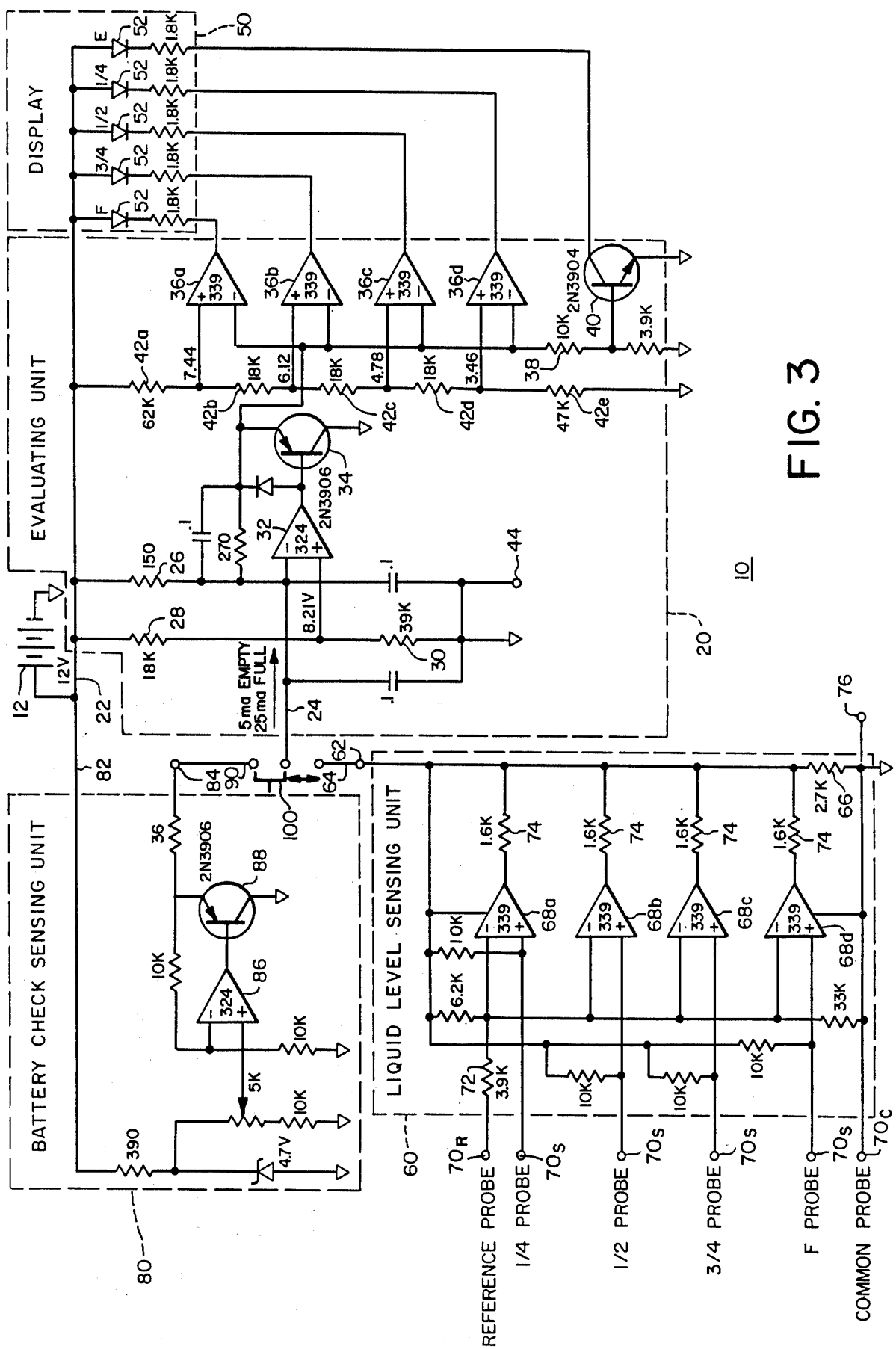
FIG. 3 is an electrical schematic diagram of the embodiment of FIG. 1.

As shown in FIG. 3, the evaluating unit 20 includes a power terminal 22 that is connected to the battery 12 and a sensing terminal 24. A resistor 26 interconnects the power terminal 22 with the sensing terminal 24 such that the sensing terminal 24 acts as a current source. Resistors 28 and 30 form a voltage divider which provides a reference voltage of about 8.2 volts in this embodiment, which is applied to the noninverting input of a voltage comparator 32. The inverting input of the voltage comparator 32 is connected to the sensing terminal 24. The output of the comparator 32 is connected to the base of a transistor 34, and the emitter of the transistor 34 is connected to the inverting input of comparators 36a,36b,36c,36d. The comparator 32 and the transistor 34 cooperate with other components of the circuit to form a current-to-voltage converter such that the voltage applied to the inverting inputs of the comparators 36a-36d varies as a function of current passed via the sensing terminal 24. The signal applied to the inverting inputs of the comparators 36a-36d is also applied via a resistor 38 to the base of a transistor 40. Resistors 42a-42e form a voltage divider which provides a respective threshold signal for each of the comparators 36a-36d.

The outputs of each of the comparators 36a-36d and the transistor 40 are each connected to a respective LED 52 included in the display 50. The evaluating unit 20 generates a voltage signal indicative of the magnitude of current flowing through the sensing terminal 24, and this voltage signal is compared with the threshold signals applied to the noninverting inputs of the comparators 36a-36d. Table 1 lists the voltage applied to the inverting inputs of the comparators 36a-36d as a function of current drawn through the sensing terminal 24. Table 1 also indicates which of the LEDs 52 are illuminated at each of the stated conditions.

TABLE 1

| Current (mA) | Voltage (V) | LEDs Turned On |
| --- | --- | --- |
| 0 | 1.50 | None |
| 5 | 2.85 | E |
| 10 | 4.20 | E,¼ |
| 15 | 5.55 | E,¼,½ |
| 20 | 6.90 | E,¼,½,¾ |
| 25 | 8.25 | E,¼,½,¾,F |

As shown in FIGS. 1 and 3, the liquid level sensing unit 60 includes an input terminal 62 which is connected via a conductor 64 to the switch 100. As explained in greater detail below, this conductor 64 is used both to supply power to the liquid level sensing unit 60 and to transmit information from the liquid level sensing unit 60 to the evaluating unit 20.

The liquid level sensing unit 60 is connected to six probes $70_C$, $70_R$, $70_S$ mounted in a wall of the container 14. Each of the probes $70_C$, $70_R$, $70_S$ is a conductive stud (such as a pop rivet, for example) which extends through the wall of the container 14 and is in electrical contact with any liquid contained in the container 14. Typically, the container 14 is formed of an insulating material such as a suitable plastic. In this embodiment, the probes include a common probe $70_C$ and a reference probe $70_R$ which are positioned at the same horizontal level near the bottom of the container 14. Also included are four level sensing probes $70_S$ positioned at the full, ¾ full, ½ full, and ¼ full levels of the container 14. Thus, when the container 14 is full, all six of the probes $70_C$, $70_R$, $70_S$ are in electrical contact with the liquid inside the container 14. When the liquid level is between the ½ full and ¼ full levels, only the common probe $70_C$, reference probe $70_R$, and ¼ level sensing probe $70_S$ are in electrical contact with the liquid within the container 14.

Figure 2:
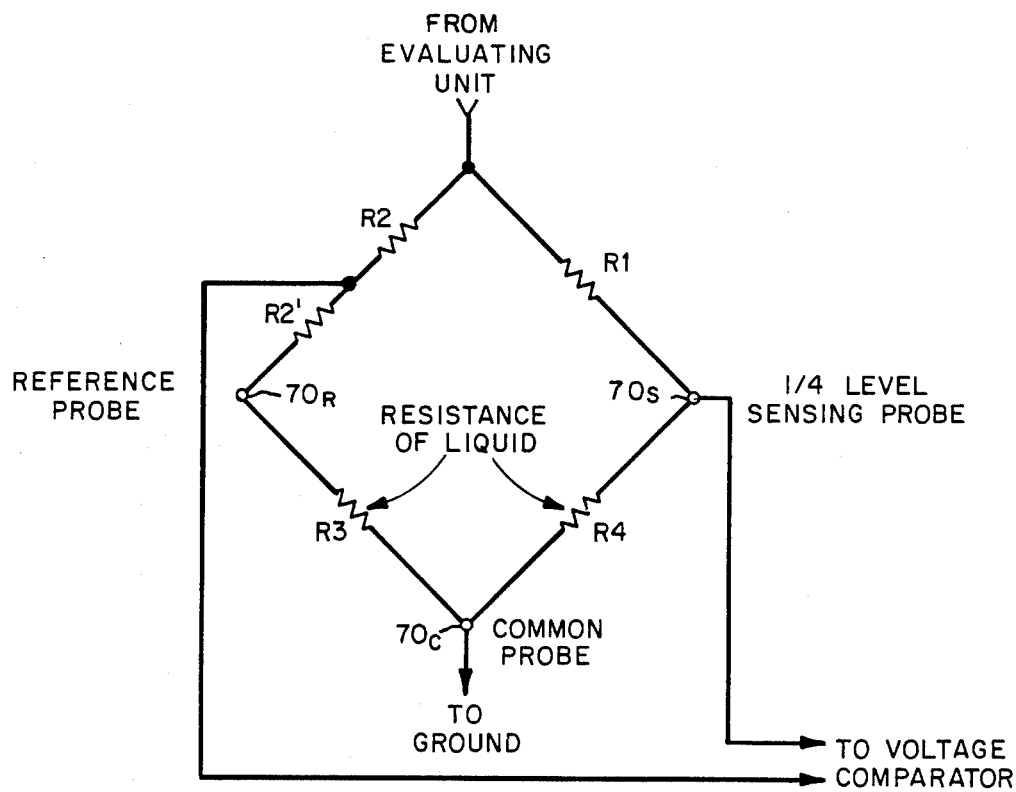
FIG. 2 is a schematic representation of a bridge circuit included in the embodiment of FIG. 1.

FIG. 2 shows a schematic representation of a portion of the liquid level sensing unit 60 which will be used to describe the general principle of operation. The liquid level sensing unit 60 includes four bridges, each for a respective one of the level sensing probes $70_S$. FIG. 2 shows schematically the bridge associated with the ¼ level sensing probe $70_S$. As shown in FIG. 2, the bridge includes the common probe $70_C$ interposed between the reference probe $70_R$ and the ¼ level sensing probe $70_S$. The resistance of liquid in the container 14 defines the values of resistors $R_3$ and $R_4$ of the bridge. The reference probe $70_R$ and the ¼ level sensing probe $70_S$ are connected to the power supply by respective bridge resistors $R_1$ and $R_2$.

A voltage comparator is used to compare the voltages at the reference probe $70_R$ and the ¼ level sensing probe $70_S$ in order to determine whether or not the bridge is in balance. In the event the reference probe and the ¼ level sensing probe are both in electrical contact with the liquid (indicating that the liquid level is above the level of the ¼ level sensing probe) then $R_3$ is approximately equal to $R_4$ and the voltage comparator will indicate that the bridge is in balance. This is taken as an indication that the liquid level is at least as high as the ¼ level sensing probe. On the other hand, in the event the liquid level is below the ¼ level sensing probe, then $R_4$ will be significantly greater than $R_3$. This imbalance can readily be detected with the voltage comparator.

It is important to recognize that the bridge of FIG. 2 allows reliable measurements to be made with liquids of widely varying resistivities. In laboratory tests the resistance of various types of drinking water over a fixed path has been found to vary by a factor greater than four to one. The variability is much greater when other materials, such as sewage and waste, are compared with bottled water. The embodiment of FIG. 2 functions reliably with a wide range of liquids having a wide range of resistivities, because the resistance between the common probe $70_C$ and the reference probe $70_R$ is used as a reference to evaluate the resistance between the common probe $70_C$ and the level sensing probe $70_S$.

Thus the conductors and resistors associated with reference probe $70_R$ operate as a means for providing reference signal indicative of electrical resistance between the common probe $70_C$ and the reference probe $70_R$ through the liquid. The voltage comparator operates as a means for comparing the reference signal with the sensing signal generated via the level sensing probe $70_S$.

FIG. 3 shows a detailed electrical schematic diagram of the presently preferred embodiment of the liquid level sensing unit 60. As shown in FIG. 3, the input terminal 62 of the liquid level sensing unit 60 is connected by a resistor 66 to ground. Four comparators 68a-68d are provided, and each has a noninverting input connected to a respective one of the level sensing probes $70_S$. The inverting inputs of the comparators 68a-68d are connected via a resistor 72 to the reference probe $70_R$. The output of each of the comparators 68a–68d is connected via a respective output resistor 74 to the input terminal 62.

In operation, when the switch 100 is positioned to interconnect the input terminal 62 of the liquid level sensing unit 60 with the sensing terminal 24 of the evaluating unit 20, a voltage is applied to the reference probe $70_R$ and each of the level sensing probes $70_S$. The common probe $70_C$ is connected to ground. The comparators 68a–68d compare the voltage of the reference probe $70_R$ as modified by the resistor 72 with the voltage of the respective level sensing probes $70_S$. In the event any of the level sensing probes $70_S$ is out of electrical contact with the liquid in the container 14, substantially no current will flow through the respective resistors 74. However, when one or more of the sensing probes $70_S$ is in contact with the liquid in the container 14, each of the respective comparators 68a–68d will act as a current sink for approximately 5 milliamps of current drawn from the input terminal 62 via the respective resistors 74.

The resistor 66 provides a constant current drain of about 5 milliamps as long as the conductor 64 is intact. In addition, a current of between 0 and 20 milliamps is drawn from the input terminal 62 by the comparators 68a–68d, at the rate of 5 milliamps per comparator coupled to a level sensing probe $70_S$ in electrical contact with the liquid in the container 14. Thus, if each of the level sensing probes $70_S$ out of contact with the liquid in the container 14, then the liquid level sensing unit 60 will draw about 5 milliamps. If any two of the level sensing probes $70_S$ are in contact with liquid in the container 14, the liquid level sensing unit 60 will draw about 15 milliamps. If all four of the level sensing probes $70_S$ are in contact with liquid in the container 14, the liquid level sensing unit 60 will draw about 25 milliamps through the conductor 64. Thus, the sensing unit 60, and in particular the comparators 68c–68d and the resistors 74, modify the current through the conductor 64 such that the current is indicative of the sensed liquid level.

From this explanation it should be clear that the conductor 64 both powers the liquid level sensing unit 60 and is used to transmit the resulting measurement of the liquid level sensing unit 60 to the evaluating unit 20. This embodiment has been adapted for use in a vehicle which uses a chassis for ground, and thus only a single conductor 64 is required. However, a ground terminal 76 is provided on the liquid level sensing unit 60 and a ground terminal 44 is provided on the evaluating unit 20. If appropriate, a ground conductor can be provided between the terminals 44 and 76, but such a ground conductor is not needed in many applications. Because the sensed information is communicated from the sensing unit 60 to the evaluating unit 20 as a current signal, it is relatively immune to noise, and no shielding or special purpose cable is required. The cable 64 should simply be adequate to transmit a 25 milliamp, 12-volt signal As pointed out above, the evaluating unit 20 of this invention is not limited to use with a liquid level sensing unit such as the sensing unit 60. Rather, the evaluating unit 20 can be used with a wide variety of sensing circuits. One alternative is the battery check sensing unit 80 which is connected to the battery 12 at a terminal 84. The battery check sensing unit 80 also includes an input terminal 84 which is connected to the switch 100 by a cable 90. The battery check sensing unit 80 includes a comparator 86 and a transistor 88 which cooperate to sink current supplied by the evaluating unit 20 via the cable 90.

The battery check sensing unit 80 of this embodiment is particularly adapted for use with a rechargeable battery such as a lead acid battery having a voltage which varies as a function of the state of charge of the battery. In particular, the components shown in FIG. 3 have been selected for use with a battery having a voltage of about 12.7 volts when in a full state of charge, and a voltage less than 11.6 volts when the state of charge is close to zero. The battery check sensing unit 80 draws approximately 25 milliamps when the voltage at the terminal 82 is 12.7 volts, and about 5 milliamps when the voltage at the terminal 82 is about 11.6 volts. Thus, the battery check sensing unit 80 draws current from the switch 100 in a manner quite similar to that of the liquid level sensing unit 60 such that the current through the conductor 90 is indicative of the voltage of the battery 12. By simply positioning the switch 100 as desired, the evaluating unit 20 and the display 50 can be used to display either the state of charge of the battery 12 or the liquid level in the container 14.

In operation, the monitoring system 10 illuminates between 0 and 5 of the LEDs 52, depending upon the current passed by the sensing terminal 24 of the evaluating unit 20. For example, when the switch 100 is positioned to interconnect the liquid level sensing unit 60 with the evaluating unit 20, the liquid level in the container 14 is the sensed parameter and the LEDs 52 indicate how many of the level sensing probes $70_S$ are in electrical contact with liquid of the container 14. When none of the level sensing probes is in contact with liquid in the container 14, but the conductor 64 is interconnecting the switch 100 with the input terminal 62 properly, only the E LED 52 is illuminated. When any one of the level sensing probes $70_S$ is in electrical contact with the liquid of the container 14, two of the LEDs are illuminated: $\frac{1}{4}$, E. Similarly, when any two of the level sensing probes $70_S$ are in contact with liquid in the container 14, three of the LEDs 52 are illuminated: $\frac{1}{4}$, $\frac{1}{4}$, E.

One important advantage of this embodiment is that it is extremely tolerant of wiring errors. All of the level sensing probes $70_S$ are electrically equivalent, and any of the comparators 68a–68d can be connected with any of the sensing probes $70_S$. Furthermore, more, splashing liquid cannot result in a situation where the F LED 52 is illuminated but the $\frac{3}{4}$ LED 52 is not. The sensing unit 60 modulates the current flow through the sensing terminal 24 to indicate the total number of sensing probes 70 in contact with the liquid. For this reason, the LEDs 52 are always illuminated in the appropriate sequence.

It should be apparent from the foregoing description that the monitoring system of this invention provides important advantages. Cabling requirements between the evaluating unit and the sensing units are minimized. A single, low-cost, unshielded conductor is suitable for many applications. Furthermore, the system is substantially immune to commonly encountered electromagnetic interference. In that the system does not generate high frequency AC signals in either of the sensing units 60,80, the system does not itself act as a source of RFI. As pointed out above, wiring difficulties are minimized, and the display 50 is controlled so as to reduce false or misleading indications.

Of course, it should be understood that a wide range of changes can be made to the preferred embodiments described above. For example, various types of sensing units can be substituted for the sensing units 60,80. Furthermore, a liquid level sensing unit utilizing a reference probe can, if desired, be coupled to a conventional evaluating unit rather than the improved evaluating unit described above. Moreover, the evaluating unit may be modified to act as a current sink rather than a current source to the sensing units. It is therefore intended that the foregoing detailed description be regarded as illustrative rather than limiting, and that it be understood that it is the following claims, including all equivalents, which are intended to define the scope of this invention.

I claim:

1. A liquid level sensing system for sensing the level of a liquid in a container, said system comprising:
   a set of sensing probes, a common probe, and a reference probe, each positioned at a respective level in electrical contact with a respective interior portion of the container;
   means for providing a reference signal indicative of electrical resistance between the common probe and the reference probe through the liquid;
   means for providing a set of sensing signals, each indicative of electrical resistance between the common probe and a respective one of the sensing probes through the liquid;
   means for comparing the reference signal with each of the sensing signals and for providing a set of output signals indicative of the number of sensing signals which deviate from the reference signal by more than a selected amount.

2. The invention of claim 1 wherein the reference probe and the common probe are horizontally aligned and are positioned beneath the sensing probes.

3. The invention of claim 1 wherein the set of sensing probes includes four sensing probes, each positioned at a separate repective level.

4. The invention of claim 1 wherein the comparing means comprises:
   a set of bridge circuits, each having the common probe as a first node of the bridge circuit, each having the reference probe as a second node of the bridge circuit, and each having the respective sensing probe as a third node of the bridge circuit, wherein each of the first nodes is positioned between the second node and the respective third node; and
   a set of voltage comparators, each coupled to the second and third nodes of the respective bridge circuit.

5. A liquid level sensing system for sensing the level of a liquid in a container, said system comprising:
   a set of sensing probes, a common probe, and a reference probe, each positioned at a respective level in electrical contact with a respective interior portion of the container;
   means for providing a reference signal indicative of electrical resistance between the common probe and the reference probe through the liquid;
   means for providing a set of sensing signals, each indicative of electrical resistance between the common probe and a respective one of the sensing probes through the liquid;
   means for comparing the reference signal with each of the sensing signals and for providing a set of output signals indicative of the number of sensing signals which deviate from the reference signal by more than a selected amount;
   an evaluating circuit;
   a conductor connected to the evaluating circuit;
   means, included in the evaluating circuit, for supplying current to the conductor;
   means for powering the reference signal generating means and the sensing signal generating means with current drawn from the conductor;
   means, included in the comparing means, for controlling current flow through the conductor such that the magnitude of current flow through the conductor is indicative of the state of the output signals generated by the comparing means; and
   means, included in the evaluating circuit, for monitoring the magnitude of current flow through the conductor to determine the state of the output signals.

6. A sensing system comprising:
   an evaluating unit;
   a sensing unit;
   a first conductor interconnecting the evaluating unit and sensing unit;
   means, included in the evaluating unit, for supplying a first current to the first conductor;
   sensor means, included in the sensing unit, for sensing a parameter having at least three amplitudes;
   means, included in the sensing unit and responsive to the sensor means, for modifying the first current through the first conductor such that the magnitude of the first current is indicative of the amplitude of the parameter; and
   means, included in the evaluating unit, for determining the magnitude of the first current in the first conductor in order to ascertain the amplitude of the parameter;
   wherein the sensor unit comprises at least one comparator means powered by the first current passing through the first conductor.

7. The invention of claim 6 wherein the sensor means comprises:
   means for sensing a voltage supplied by a battery such that the first current through the first conductor is indicative of the voltage of the battery.

8. The invention of claim 6 wherein the current modifying means sets the first current to first, second and third nonzero values, each indicative of a respective one of the amplitudes of the parameter.

9. The invention of claim 6 wherein the sensor means comprises:
   a set of sensor probes and a common probe, each mounted at a respective level of a container for a liquid such that a lower resistance path is formed between the common probe and each of the sensor probes contacted by the liquid; and
   means for comparing resistance between the common probe and each of the sensor probes with a resistance threshold;
   wherein the current modifying means comprises means for modifying the first current to indicate the number of low resistance paths formed between the common probe and the sensor probes.

10. The invention of claim 9 further comprising:
    means for measuring electrical resistance of the liquid; and
    means for setting the resistance threshold in accordance with the measured electrical resistance of the liquid.

11. A liquid level sensing system for sensing the level of a liquid in a container, said system comprising:
    an evaluating circuit;

a sensing circuit comprising a common probe, a reference probe, and a plurality of sensing probes, each secured to the container at a respective level to make electrical contact with the liquid at the respective level;

a first conductor interconnecting the evaluating circuit and the sensing circuit;

means, powered by current passing through the first conductor, for providing a reference signal indicative of resistance between the common and reference probes through the liquid;

means, powered by current passing through the first conductor, for providing a plurality of sensing signals, each indicative of resistance between the common probe and a respective one of the sensing probes;

means, powered by current passing through the first conductor, for comparing the reference signal and each of the sensing signals and controlling current through the first conductor such that the magnitude of current through the first conductor is indicative of the number of the sensing signals having a selected relative magnitude with respect to the reference signal; and means, included in the evaluating circuit, for measuring current flow through the first conductor and for indicating the number of the sensing signals having the selected relative magnitude with respect to the reference signal in response to the measured current flow.

12. The invention of claim 11 further comprising:

an additional sensing circuit coupled to the evaluating circuit by a second conductor;

means for selectively connecting one of the first and second conductors to the evaluting circuit; and means, included in the additional sensing circuit, for controlling current through the second conductor as a function of a voltage supplied by a battery such that current through the second conductor is indicative of the voltage of the battery.

13. The invention of claim 11 wherein the reference probe and the common probe are horizontally aligned and are positioned beneath the sensing probes.

14. The invention of claim 13 wherein the plurality of sensing probes includes four sensing probes, each positioned at a separate respective level.

15. The invention of claim 11 wherein the comparing means comprises:

a set of bridge circuits, each having the common probe as a first node of the bridge circuit, each having the reference probe as a second mode of the bridge circuit, and each having a respective one of the sensing probes as a third node of the bridge circuit, wherein each of the first nodes is positioned between the respective second and third nodes; and a set of voltage comparators, each coupled to the second and third nodes of the respective bridge circuit.

* * * * *

UNITED STATES PATENT AND TRADEMARK OFFICE
CERTIFICATE OF CORRECTION

PATENT NO. : 4,739,658
DATED : April 26, 1988
INVENTOR(S) : William H. Slavik

It is certified that error appears in the above-identified patent and that said Letters Patent is hereby corrected as shown below: On the Title Page:

IN THE REFERENCES CITED
U.S. PATENT DOCUMENTS

In reference 4,038,634  7/1977, please delete "340/52 X" and substitute therefor --340/521 X--.

In reference 4,396,889  8/1983, please delete "Aria" and substitute therefor --Arai--.

IN THE ABSTRACT LINES 18-19

In the sentence beginning "The evaluating unit ...," please insert --a-- before "voltage proportional to ...".

IN THE DETAILED DESCRIPTION OF THE
PRESENTLY PREFERRED EMBODIMENTS

In column 4, line 1, please delete the "," after "when".

In column 4, line 52, please insert "a" after "providing".

In column 5, line 28, please insert "is" after "$70_S$" and before "out".

UNITED STATES PATENT AND TRADEMARK OFFICE
CERTIFICATE OF CORRECTION

PATENT NO. : 4,739,658
DATED : April 26, 1988
INVENTOR(S) : William H. Slavik

It is certified that error appears in the above-identified patent and that said Letters Patent is hereby corrected as shown below:

IN THE DETAILED DESCRIPTION OF THE
PRESENTLY PREFERRED EMBODIMENTS

In column 5, line 58, please insert "." after "signal".

In column 6, line 45, please delete "more,".

IN THE CLAIMS

In claim 9 (column 8, line 50), please delete "lower" and substitute therefor --low--.

In claim 15 (column 10, line 23), please delete "mode" and substitute therefor --node--.

Signed and Sealed this

Seventh Day of February, 1989

Attest:

DONALD J. QUIGG

*Attesting Officer*  *Commissioner of Patents and Trademarks*